United States Patent

McDicken

[15] 3,688,564
[45] Sept. 5, 1972

[54] ULTRASONIC SCANNING APPARATUS

[72] Inventor: William Norman McDicken, Glasgow, England

[73] Assignee: National Research Development Corporation, London, England

[22] Filed: Dec. 1, 1970

[21] Appl. No.: 93,927

[30] Foreign Application Priority Data

Dec. 2, 1969 Great Britain..........58,853/69

[52] U.S. Cl.................................................73/67.8
[51] Int. Cl..............................................G01n 29/04
[58] Field of Search........................73/67.8 S, 71.5 U

[56] References Cited

UNITED STATES PATENTS

| 3,247,709 | 4/1966 | Gordon | 73/67.8 S |
| 3,496,764 | 2/1970 | Stouffer | 73/67.8 S |
| 3,543,229 | 11/1970 | Baum | 73/67.8 S X |

Primary Examiner—James J. Gill
Attorney—Cushman, Darby & Cushman

[57] ABSTRACT

Medical diagnostic or similar ultrasonic scanning apparatus of basically A-scan form is adapted to give a B-scope display by the use of a mechanically flexible array of elongate members having its ends in mutually registered assemblies of which at least one is rectilinear. The other assembly is arranged for response thereacross to intensity modulated signal components representing reflection along the ultrasonic transducer beam path, and provides a corresponding light signal display at the one assembly for presentation to a camera. The flexibility of the array allows the light signal display to be manipulated in synchronism with the transducer by use of a simple mechanical linkage, so avoiding the complex electronics of convention B-scope equipment. The array can be of fiber optic form extending between a cathode ray tube A-scan output and a camera, or flexible electrical conductors leading to photodiodes or other light generating means.

7 Claims, 1 Drawing Figure

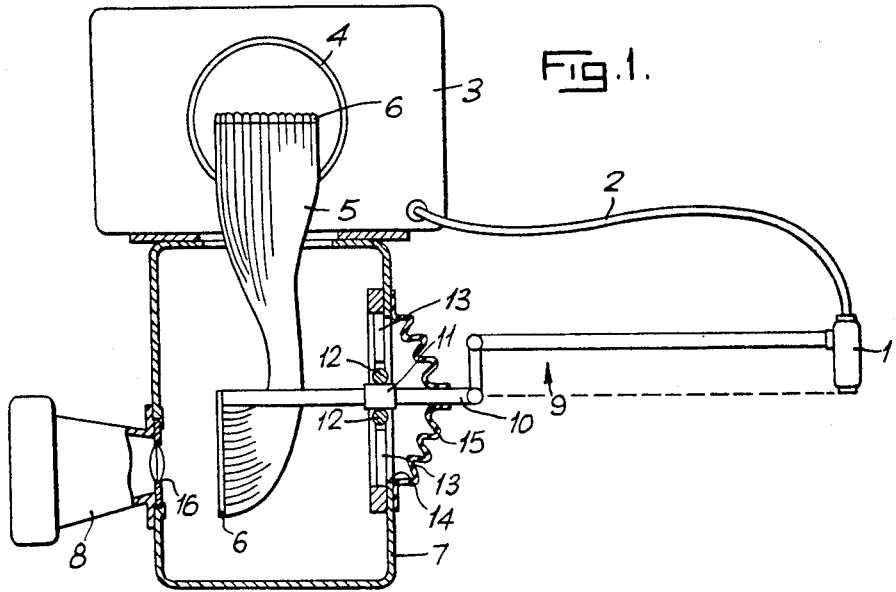
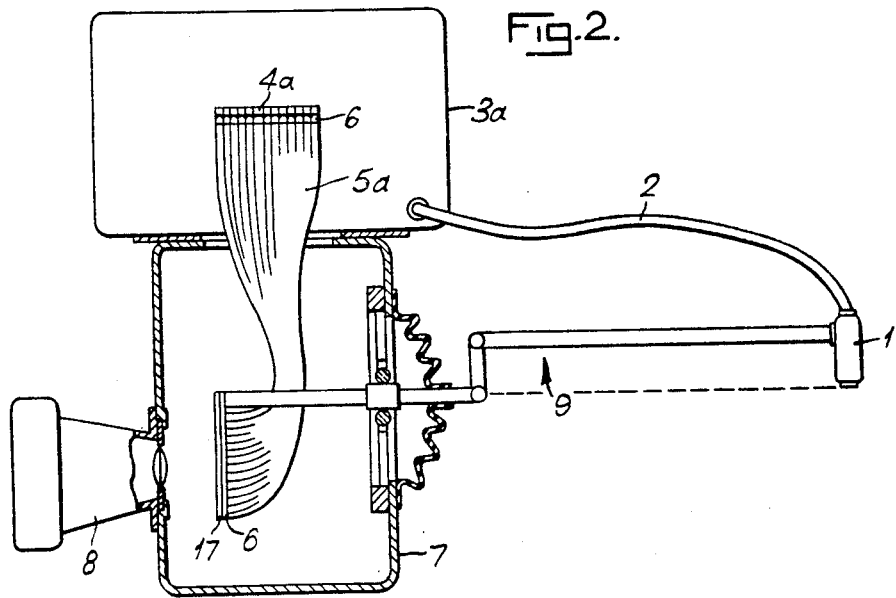

ULTRASONIC SCANNING APPARATUS

This invention concerns ultrasonic scanning apparatus and more particularly such apparatus suitable for medical diagnostic purposes. Apparatus of this more general kind is in fact already available in various forms of which two are often referred to, somewhat loosely, as A-scan and B-scope.

Briefly, in A-scan apparatus an ultrasonic transducer assembly is located in a static position relative to a subject and, by use of pulse echo techniques, makes available data, normally by way of a cathode ray tube display, regarding tissue boundaries and other interfaces or reflecting surfaces along the axis of the beam transmitted from the transducer assembly. B-scope apparatus employs the same techniques but involves movement of the transducer assembly and a similar, related movement of the visual display whereby an accumulated photographic or equivalent record can be produced to provide a two-dimensional 'picture' for subsequent study. The term B-scope in fact embraces a variety of apparatus involving different modes of movement for the transducer assembly, these being discussed, together with other features of such apparatus in an article entitled "Visualisation of Soft Tissues in Two and Three Dimensions — Limitations and Developments" by T.G. Brown (Ultrasonics, April 1967, pages 118-123).

B-scope apparatus is considerably more complex and expensive than A-scan since the former involves complex electronics to move the display in controlled relation with the transducer assembly.

An object of the present invention is to afford the results of B-scope type scanning without the conventional complexity and expense.

To this end the present invention provides ultrasonic scanning apparatus comprising: an ultrasonic transducer for transmitting and receiving pulse sound energy an reflections thereof along a predetermined beam path through a subject; a data processing unit responsive to said transducer to provide an intensity modulated electrical signal of which successive components represent the reflection properties of the subject along said path; a mechanically flexible array of elongate members, which array has its ends conformed in mutually registered assemblies of which at least one is rectilinear, and the other of said assemblies being responsive therealong to said successive components to generate corresponding light signal components along said one assembly; a camera; a light-tight enclosure housing said camera and said one assembly in opposed disposition; and a linkage connecting said transducer and said one assembly to retain said one assembly in a predetermined positional relationship with said beam path as said transducer is move to vary said beam path.

In one form of such apparatus the data processing unit produces an intensity modulated trace along a fixed line in a cathode ray tube. The flexible array is then provided in the fiber optic form with one end of the array positioned over the fixed trace line to transmit the trace to the other end of the array which can be moved together with the transducer by way of the linkage.

In another form of the apparatus the data processing unit produces intensity modulated signal components along a sequence of terminals representing the beam path. The flexible array is then provided in the form of electrical conductors connected to the terminals at one end and having photodiodes, or the equivalent, at the other end to generate the light signals.

It will be seen that in both these forms of apparatus the processing unit is basically that of an A-scan system, but the camera is effectively presented with a B-scope display by way of the flexible array.

For a clearer understanding of the present invention, the same will now be described by way of example with reference to the accompanying drawings, in which;

FIG. 1 schematically illustrates an embodiment of the fibreoptic form of apparatus referred to above, and FIG. 2 similarly illustrates an embodiment of the photodiode form of apparatus referred to above.

In FIG. 1 the transducer assembly is indicated at 1 connected by lines 2 to a substantially conventional A-scan unit 3 with a cathode ray tube 4 display. In fact, it is more conventional for an A-scan unit to provide a cathode ray tube display with X-deflection to represent the beam path from the associated tranducer 1 while Y-deflection is effected in accordance with the amplified echo signal representing the reflection properties of the subject along that path. In the present case, the unit is modified so that the amplified echo signals are applied to the cathode of tube 4, rather than the Y-deflection plates, so as to produce an intensity modulated rectilinear trace display on the tube. Also, it is desirable to connect the Y-deflection plates of the tube together in order to prevent stray signals being picked up by one of the plates alone and influencing the electron beam of the tube. These modifications are minor and straightforward, and can be provided with switching to afford selection between the two display modes.

A fiber optic array 5 has both ends in register and conformed by clamping, or in other suitable manner, into rectilinear assemblies as indicated at 6. One of the assemblies 6 is mounted along the the trace path of the tube to transmit the trace to the other assembly 6. This second assembly is mounted in a light-tight enclosure 7 in opposition with a camera 8.

A mechanical linkage 9 connects the transducer 1 with the second assembly 6 so that these components move in synchronism. More particularly this linkage allows rotational and translational movement of the second assembly 6 in a plane parallel to the focal plane of the camera, the axis of the rotational movement passing through the crystal of the transducer and the zero point of the second assembly 6. For this purpose the linkage comprises a cranked rod 10 connecting the transducer 1 and second assembly 6, the rod 10 is journalled in a rotary support 11, the support is slidably mounted between two horizontally parallel slideway rods 12, and the rods 12 are slidably mounted between two vertically parallel slideway rods 13. The vertical rods are mounted on opposite sides of an aperture 14 in a side wall of the enclosure 7 with the horizontal rods spanning the aperture. The aperture is covered by a flexible mask 15, such as of fabric, extending between its boundary and the rotary support to retain the enclosure light tight. The camera 8 is separably connected in a further aperture 16 opposite that just discussed.

It will be seen that a trace on the tube 4 is transmitted by the array 5 to the outer assembly 6 for presentation to the camera while permitting movement in synchronism with the transducer to provide a B-scope mode display. It is important to note that both the A-scan unit and the camera are stationary, and that the camera can be of conventional form.

In practice the array 5 can be made of bundles of fibers and it is unnecessary that the fibers of an individual bundle be mutually registered at their ends providing that the bundles are so registered. The effect of any light losses in the optical system can be reduced by providing a high brilliance, this being conveniently achieved by operating at a suitably high pulse repetition rate. A frequency of 1,000 pulses per second has been found suitable for this last purpose. The fibers of the array should be chosen only to transmit light received within a small angle, up to about 15°, relative to their longitudinal axes. Acceptance of light within larger angles degrades the linear resolution of the system, but with a suitable choice of fibers this can be as low as 3 or 4 mm. Some degradation is inherent as a result of the thickness of the glass face of the cathode ray tube. This also can be reduced by use of a lens to project the tube trace onto the adjacent array, but this will normally be unnecessary since the linear resolution is readily made equal to or better than the lateral resolution as determined by the ultrasound been width.

Also, notwithstanding the high brilliance, it is desirable that the trace of the tube should not persist unduly. This presents no difficulty since A-scan unit tubes conventionally employ blue or green phosphors having persistence times of microsecond and millisecond orders.

The array can, if desired, be as arranged to provide amplification or reduction of the tube trace.

Turning to the embodiment of FIG. 2, this is similar in many respects to that of FIG. 1 as is indicated by the use of common reference numerals where appropriate. One of the differences in this case is that the A-scan unit 3a provides successive intensity modulated signal components, as previously applied to the cathode of tube 4, to a sequence of terminals 4a.

An array 5a of electrical conductors have mutually registered end assemblies 6 is connected at one such assembly to the terminals 4a while the other end assembly is connected to photodiode devices 17 in a one-to-one relationship with the conductors of the array. An alternative to the use of photodiodes could involve the use of an electroluminescent strip having a conductor along its length to cooperate with those of the array in selection matrix manner.

In any event, it will be seen that the embodiment of FIG. 2 is functionally equivalent to that of FIG. 1. Both embodiments are advantageous in providing a B-scope form display by use of their arrays and mechanical manipulation thereof in a manner which is simpler and more economic than the conventional electronic manipulation. The cost of keeping the mechanical manipulation simple may be some loss in the degrees of freedom of the possible scanning modes. However, the above described linkage arrangement allows scanning in the longitudinal and transverse directions by suitable relative disposition of the subject and apparatus, these being the most important scanning directions for medical purposes. Also the rotational facility allows rocking of the transducer while maintaining the transducer tip substantially in contact with the subject.

Clearly other forms of linkage can be employed to provide other scanning movements and combinations thereof. Also, it will be appreciated that other modes of linkage constructions can be used, such as employing magnetic or other sliding arrangements to permit movement of the linkage relative to the light-tight enclosure, servo-coupling in the linkage, and so on.

I claim:

1. Ultrasonic scanning apparatus comprising:
an ultrasonic transducer for transmitting and receiving pulse sound energy and reflections thereof along a predetermined beam path through a subject;
a data processing unit responsive to said transducer to provide an intensity modulated electrical signal of which successive components represent the reflection properties of the subject along said path;
a mechanically flexible array of elongate members, which array has its ends conformed in mutually registered assemblies of which at least one is rectilinear, and the other of said assemblies being responsive therealong to said successive components to generate
corresponding light signal components along said one assembly; a camera;
a light-tight enclosure housing said camera and said one assembly in opposed disposition;
and a linkage connecting said transducer and said one assembly to retain said one assembly in a predetermined positional relationship with said beam path as said transducer is moved to vary said beam path.

2. Apparatus according to claim 1 wherein said processing unit comprises electric light generating means responsive to said electrical signal to generate a corresponding light trace along a predetermined linear path, and said array is of fiber optic form having said other assembly disposed along said linear path.

3. Apparatus according to claim 2 wherein said electric light generating means comprise a cathode ray tube.

4. Apparatus according to claim 1 wherein said array comprises a plurality of electrical conductors connected in said one assembly to electric light generating means and connected in said other assembly to said processing unit for response to said successive components.

5. Apparatus according to claim 4 wherein said electric light generating means comprise a plurality of photodiodes.

6. Apparatus according to claim 1 wherein said linkage comprises an elongate component connected at respectively opposite ends to said transducer and said one assembly, and a two-co-ordinate tranversing mechanism supporting said elongate component between its ends to afford movement of said one assembly within a predetermined plane parallel to the focal plane of said camera.

7. Apparatus according to claim 1 wherein said linkage comprises an elongate component connected at respectively opposite ends to said transducer and said one assembly, and a support mechanism for said elongate component, said elongate component being formed and mounted in said support mechanism for rotation about an axis passing perpendicularly through one end of said one assembly and also through said transducer.

* * * * *